(12) United States Patent
Zhang

(10) Patent No.: US 12,413,738 B2
(45) Date of Patent: Sep. 9, 2025

(54) VIDEO ENCODING METHOD AND APPARATUS AND ELECTRONIC DEVICE

(71) Applicant: VIVO MOBILE COMMUNICATION CO., LTD., Guangdong (CN)

(72) Inventor: Yong Zhang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 76 days.

(21) Appl. No.: 18/485,487

(22) Filed: Oct. 12, 2023

(65) Prior Publication Data

US 2024/0040127 A1 Feb. 1, 2024

Related U.S. Application Data

(63) Continuation of application No. PCT/CN2022/088950, filed on Apr. 25, 2022.

(30) Foreign Application Priority Data

Apr. 26, 2021 (CN) .................. 202110454418.X

(51) Int. Cl.
*H04N 19/14* (2014.01)
*H04N 19/172* (2014.01)
*H04N 19/196* (2014.01)

(52) U.S. Cl.
CPC ........... *H04N 19/14* (2014.11); *H04N 19/172* (2014.11); *H04N 19/196* (2014.11)

(58) Field of Classification Search
CPC ..... H04N 19/14; H04N 19/172; H04N 19/196
See application file for complete search history.

(56) References Cited

U.S. PATENT DOCUMENTS 6,522,693 B1 * 2/2003 Lu ..................... H04N 19/149
375/E7.218
6,940,902 B2 * 9/2005 Nakamura ........... H04N 19/124
375/E7.181

(Continued)

FOREIGN PATENT DOCUMENTS

CN   101188755    * 12/2007
CN   101188755 A    5/2008

(Continued)

OTHER PUBLICATIONS

Huang, Chao translation of CN 111432222 Dec. 30, 2019 (Year: 2019).*

(Continued)

*Primary Examiner* — Zaihan Jiang
(74) *Attorney, Agent, or Firm* — Price Heneveld LLP

(57) ABSTRACT

This application discloses a video encoding method and apparatus and an electronic device, and belongs to the field of communications technologies. The method includes: determining, based on a first ratio, a first bit number, and a first number, a second bit number for encoding a first picture; and encoding the first picture based on the second bit number, where the first ratio is a ratio of predicted encoding complexity of the first picture to actual encoding complexity of M frames of second pictures, the first picture is an unencoded first frame of picture in a target group of pictures, the M frames of second pictures are encoded pictures in the target group of pictures, the first bit number is the number of remaining bits in the target group of pictures, the first number is the number of unencoded pictures in the target group of pictures.

15 Claims, 4 Drawing Sheets

(56) References Cited

U.S. PATENT DOCUMENTS

| | | | |
|---|---|---|---|
| 10,819,997 B2* | 10/2020 | Ramamurthy | H04N 19/436 |
| 2004/0091045 A1* | 5/2004 | Chang | H04N 19/14 |
| | | | 375/240.03 |
| 2004/0202247 A1* | 10/2004 | Chang | H04N 19/14 |
| | | | 375/E7.181 |
| 2004/0233984 A1* | 11/2004 | Chang | H04N 19/152 |
| | | | 375/E7.157 |
| 2004/0234142 A1* | 11/2004 | Chang | H04N 19/124 |
| | | | 375/E7.157 |
| 2005/0175091 A1 | 8/2005 | Puri et al. | |
| 2005/0175092 A1 | 8/2005 | Puri et al. | |
| 2007/0297508 A1 | 12/2007 | Kobayashi | |
| 2019/0394466 A1 | 12/2019 | Gao et al. | |

FOREIGN PATENT DOCUMENTS

| | | | |
|---|---|---|---|
| CN | 101895758 A | | 11/2010 |
| CN | 101895759 A | | 11/2010 |
| CN | 101895759 B | | 10/2011 |
| CN | 102752591 A | | 10/2012 |
| CN | 103051897 A | | 4/2013 |
| CN | 108200431 A | | 6/2018 |
| CN | 111432222 | * | 12/2019 |
| CN | 113286145 A | | 8/2021 |
| JP | 4547048 | * | 5/1997 |
| JP | 2008005337 A | | 1/2008 |
| JP | 2010062999 A | | 3/2010 |
| JP | 2013128189 A | | 6/2013 |

OTHER PUBLICATIONS

Huang, Chao translation of CN 101188755 Dec. 14, 2007 (Year: 2007).*

Alexandre, Patrice translation of JP 4547048 May 7, 1997 (Year: 1997).*

Chen et al, "A Reformative Frame Layer Rate Control Algorithm for H.264", IEEE Transactions on Consumer Electronics, vol. 56, No. 4, Nov. 2010.

Lee et al, "Scalable Rate Control for MPEG-4 Video", IEEE Transactions on Circuits and Systems for Video Technology, vol. 10, No. 6, Sep. 2000.

* cited by examiner

VIDEO ENCODING METHOD AND APPARATUS AND ELECTRONIC DEVICE

CROSS-REFERENCE TO RELATED APPLICATIONS

This application is a continuation application of International Application No. PCT/CN2022/088950 filed on Apr. 25, 2022, which claims priority to Chinese Patent Application No. 202110454418.X, filed in China on Apr. 26, 2021, which are incorporated herein by reference in their entireties.

TECHNICAL FIELD

This application belongs to the field of communications technologies, and specifically, relates to a video encoding method and apparatus and an electronic device.

BACKGROUND

Video encoding is a data compression method for digital videos, intended to remove redundancy from raw video pictures to reduce storage and transmission costs, and minimize distortion in encoded video pictures under the same encoding bitrate to improve quality of an encoded video.

Currently, a video may be encoded by using a JVT-G012 bitrate control algorithm in the H.264/AVC video coding standard. The JVT-G012 bitrate control algorithm implements three-level bitrate control: per GOP (Group of Pictures), per frame, and per macro block, providing comprehensive control functions.

However, when a group of pictures in a video sequence includes no P-frame picture (namely, forward search frame), the JVT-G012 bitrate control algorithm allocates the number of bits to a P-frame picture in the group of pictures in an equal allocation manner. In other words, the JVT-G012 bitrate control algorithm does not consider encoding complexity at the frame level during bit allocation. This may cause fluctuation of a peak signal-to-noise ratio (PSNR) curve of frames of pictures in the GOP, and thus lead to a decrease of an average peak signal-to-noise ratio (PSNR) of the entire video sequence. Consequently, an encoded video has poor quality.

SUMMARY

An objective of the embodiment of this application is to provide a video encoding method and apparatus and an electronic device.

According to a first aspect, an embodiment of this application provides a video encoding method. The method includes: determining, based on a first ratio, a first bit number, and a first number, a second bit number for encoding a first picture; and encoding the first picture based on the second bit number, where the first ratio is a ratio of predicted encoding complexity of the first picture to actual encoding complexity of M frames of second pictures, the first picture is an unencoded first frame of picture in a target group of pictures, the M frames of second pictures are encoded pictures in the target group of pictures, the first bit number is the number of remaining bits in the target group of pictures, the first number is the number of unencoded pictures in the target group of pictures, and M is an integer greater than 1.

According to a second aspect, an embodiment of this application provides a video encoding apparatus. The apparatus includes a determining module and an encoding module. The determining module is configured to determine, based on a first ratio, a first bit number, and a first number, a second bit number for encoding a first picture; and the encoding module is configured to encode the first picture based on the second bit number that is determined by the determining module, where the first ratio is a ratio of predicted encoding complexity of the first picture to actual encoding complexity of M frames of second pictures, the first picture is an unencoded first frame of picture in a target group of pictures, the M frames of second pictures are encoded pictures in the target group of pictures, the first bit number is the number of remaining bits in the target group of pictures, the first number is the number of unencoded pictures in the target group of pictures, and M is an integer greater than 1.

According to a third aspect, an embodiment of this application provides an electronic device, where the electronic device includes a processor, a memory, and a program or instructions stored in the memory and capable of running on the processor, and when the program or the instructions are executed by the processor, the steps of the method according to the first aspect are implemented.

According to a fourth aspect, an embodiment of this application provides a readable storage medium, where a program or instructions are stored in the readable storage medium, and when the program or the instructions are executed by a processor, the steps of the method according to the first aspect are implemented.

According to a fifth aspect, an embodiment of this application provides a chip, where the chip includes a processor and a communications interface, the communications interface is coupled to the processor, and the processor is configured to run a program or instructions, to implement the method according to the first aspect.

In the embodiments of this application, a second bit number for encoding a first picture may be determined based on a first ratio, a first bit number, and a first number; and the first picture is encoded based on the second bit number, where the first ratio is a ratio of predicted encoding complexity of the first picture to actual encoding complexity of M frames of second pictures, the first picture is an unencoded first frame of picture in a target group of pictures, the M frames of second pictures are encoded pictures in the target group of pictures, the first bit number is the number of remaining bits in the target group of pictures, the first number is the number of unencoded pictures in the target group of pictures, and M is an integer greater than 1. In this solution, the first ratio may indicate relative encoding complexity between the first picture and the encoded M frames of second pictures in the target group of pictures. To be specific, in the video encoding method provided in the embodiments of this application, a number of bits may be allocated to a to-be-encoded picture based on relative encoding complexity between the to-be-encoded picture and an encoded picture in the target group of pictures, the number of remaining bits in the target group of pictures, and the number of remaining frames in the target group of pictures. Therefore, encoded bits used for a picture with low encoding complexity in the target group of pictures can be saved, and the saved encoded bits are used for encoding a picture with high encoding complexity. This can alleviate fluctuation of a PSNR curve of each frame of picture in the group of pictures while keeping an average encoding bitrate close to a target bitrate (an average encoding bitrate), and therefore can improve quality of an encoded video.

DESCRIPTION OF EMBODIMENTS

Figure 1:
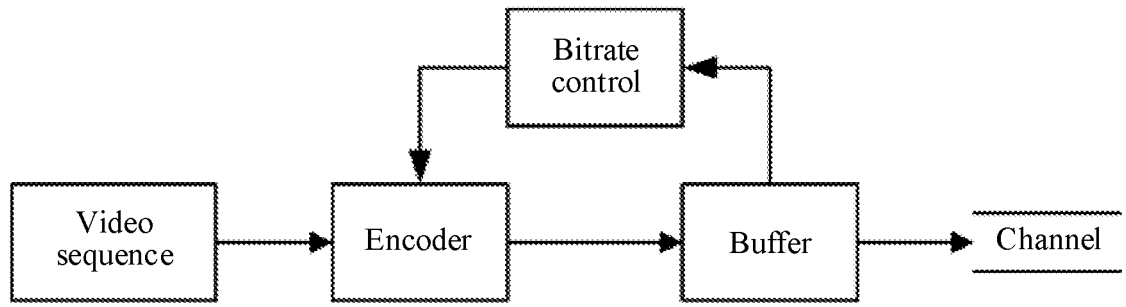
FIG. 1 is a diagram of a basic framework of bitrate control in video encoding.

The following clearly describes the technical solutions in the embodiments of this application with reference to the accompanying drawings in the embodiments of this application. Clearly, the described embodiments are some but not all of the embodiments of this application. All other embodiments obtained by persons of ordinary skill in the art based on the embodiments of this application shall fall within the protection scope of this application.

The terms "first", "second", and the like in the specification and claims of this application are used to distinguish between similar objects, but not to indicate a specific order or sequence. It should be understood that the data used in this way is interchangeable in appropriate circumstances, so that the embodiments of this application can be implemented in other orders than the order illustrated or described herein. In addition, the objects distinguished by "first", "second", and the like usually belong to one category, and the number of objects is not limited. For example, there may be one or more first objects. In addition, in the specification and claims, "and/or" represents at least one of connected objects, and the character "/" typically represents an "or" relationship between the associated objects.

The following first describes some nouns or terms used in the claims and specification of this application.

Basic unit (BU): a collection of one or more macro blocks (MBs). The number of MBs included in a BU should be able to be exactly divided by the number of MBs included in a frame of picture. For example, in a video sequence in a QCIF format, if a frame of picture includes 99 MBs, a BU of the picture may include 99, 33, 11, 9, 3, or 1 MB, and therefore the picture may include 1, 3, 9, 11, 33, or 99 BUs.

It can be learned that a BU may include an MB, a slice, a field, or a frame of picture.

For example, a basic unit (BU) includes at least one macro block. Assuming that a picture includes a macro blocks (MBs) and a BU includes b consecutive MBs, c=a/b, where c is the number of all BUs included in the picture, and a, b, and c are all positive integers.

It should be noted that all macro blocks (MBs) in a basic unit (BU) are encoded by using a same quantization parameter (QP). A larger number of MBs included in a BU indicates a larger size of the BU, lower calculation complexity for encoding the BU, and lower control accuracy. A smaller number of MBs included in a BU indicates a smaller size of the BU, higher calculation complexity for encoding the BU, and higher control accuracy. In a real-time application, a BU with a size is usually selected. For example, all MBs in a row of a picture constitute a basic unit (BU), or a frame of picture serves as a basic unit (BU).

Traffic round-trip model: used for calculating target bits to be allocated to a current frame of picture, namely, a number of bits to be allocated to the current frame of picture.

Specifically, it is assumed that N indicates the number of pictures included in a GOP of a video sequence, where N is an integer greater than 1; $n_{i,j}$=1, 2, . . . , j=1, 2, . . . , N) indicates a $j^{th}$ frame of picture (referred to as a picture j below) in an $i^{th}$ GOP of the video sequence; and $B_c(n_{i,j})$ indicates actual usage of a buffering region of a buffer after a picture $n_{i,j}$ is encoded. In this case, the following formula is obtained:

$$B_c(n_{i,j}) = \min\left\{\max\left\{0, B_c(n_{i,j-1}) + A(n_{i,j}) - \frac{u(n_{i,j-1})}{F_r}\right\}, B_s\right\} \quad (1)$$

$$B_c(n_{1,1}) = \frac{B_s}{a_0}$$

$$B_c(n_{i+1,0}) = B_c(n_{i,N})$$

In the formula (1), $A(n_{i,j})$ is an actual number of bits generated by encoding the picture $n_{i,j}$, $u(n_{i,j-1})$ is instantaneous channel bandwidth before the picture $n_{i,j}$ is encoded, $F_r$ is an encoding frame rate, $B_s$ indicates a size of the buffering region of the buffer, and maximum usage of the buffering region is determined by different profiles (Profile) and levels (Level).

$$B_c(n_{1,1}) = \frac{B_s}{a_0}$$

indicates actual usage of the buffering region after a $1^{st}$ frame of picture in a $1^{st}$ GOP is encoded, $a_0$ is a constant, and a value of $a_0$ is usually 8. $B_c(n_{i+1,0})$=1 $B_c(n_{i, N})$ indicates that actual usage of the buffering region before a $1^{st}$ frame of picture in an $(i+1)^{th}$ GOP is encoded is the same as actual usage of the buffering region after a last frame of picture in the $i^{th}$ GOP is encoded.

Buffer: also referred to as a buffer register, and used for temporarily storing data sent by a peripheral device (for example, an encoder), to transmit the data through channel bandwidth. A buffering region in the embodiments of the present application is a buffering region of a buffer.

Linear MAD prediction model: used for predicting a MAD of a $j^{th}$ frame of picture based on an actual MAD of a $(j-1)^{th}$ frame of picture, or predicting a MAD of a basic unit at a corresponding position in a $j^{th}$ frame of picture based on a MAD of a basic unit in a $(j-1)^{th}$ frame of picture, where j is a positive integer greater than 1.

For example, a MAD of a basic unit BU1 in the $j^{th}$ frame of picture is predicted by using the linear prediction model. It is assumed that the BU1 corresponds to a BU2 at a corresponding position in the $(j-1)^{th}$ frame of picture, a MAD value of the BU1 is $MAD_{cb}$, and a MAD value of the BU2 is $MAD_{pb}$. In this case, the linear MAD prediction model may be expressed as the following formula (2):

$$MAD_{cb}=a_1*MAD_{pb}+a_2 \quad (2)$$

In the formula (2), $a_1$ and $a_2$ are two parameters of the linear MAD prediction model, initial values of a1 and a2 are set to 1 and 0 respectively, and a1 and a2 are updated after each BU is encoded. It should be noted that a1 and a2 may be updated based on a difference between a predicted MAD value and an actual MAD value. A specific method may be determined according to an actual use requirement, and is not specifically limited herein.

MAD of a picture: a mean absolute deviation between a YUV value (for example, a Y value) of a current frame of picture and a YUV value (for example, a Y value) of a previous frame of picture (which should be a P-frame picture or an I-frame picture) of the current frame of picture.

"Y" in YUV indicates luminance (Luminance or Luma), and "U" and "V" indicate chrominance or chroma (Chrominance or Chroma). "U" and "V" are intended to describe a color and saturation of a picture, and are used for indicating a color degree of the picture.

MAD of a basic unit (BU): a mean absolute deviation between a YUV value of a BU and a YUV value of another BU, where the another BU is a BU in a previous frame of picture (for example, a $(j-1)^{th}$ frame of picture) of a picture (for example, a $j^{th}$ frame of picture) in which the BU is located, coordinate information of the BU in the $j^{th}$ frame of picture is the same as coordinate information of the another BU in the $(j-1)^{th}$ frame of picture, the $j^{th}$ frame of picture and the $(j-1)^{th}$ frame of picture belong to a same group of pictures, and j is an integer greater than 1.

The following describes in detail a video encoding method provided in the embodiments of this application with reference to the accompanying drawings and by using specific embodiments and application scenarios thereof.

Transmission bandwidth for a video signal is usually limited to some extent. To effectively transmit video data and ensure playback quality for a video service while meeting a requirement for channel bandwidth and a transmission delay, bitrate control needs to be performed during video encoding. The bitrate control is to make a bitrate of an encoded video signal meet a bandwidth limit and minimize encoding distortion by selecting an appropriate encoding parameter such as a quantization parameter (QP), and encoding, based on the quantization parameter, a picture corresponding to the quantization parameter. It can be understood that the bitrate control is a typical multi-constraint and multi-objective rate distortion optimization issue. The issue may be described as follows: Under the condition that a total number of encoded bits of a video signal is less than or equal to Rc (limiting bits or target bits), an optimal encoding parameter is determined for each encoding unit to minimize total distortion. This may be specifically expressed as the following formula (3):

$$Q^* = (Q_1^*, Q_2^*, \ldots, Q_N^*) = \underset{(Q_1, Q_2, \ldots, Q_N)}{\arg\min} \sum_{i=1}^{N} D_i \ \text{s.t.} \ \sum_{i=1}^{N} R_i \leq R_c \quad (3)$$

In the formula (3), N is the number of pictures included in a video sequence; $D_i$ is encoding distortion of an $i^{th}$ frame of picture in the video sequence; $R_i$ is the number of encoded bits of the $i^{th}$ frame of picture in the video sequence; $Q^*=(Q_1^*, Q_2^*, \ldots, Q_N^*)$ is an optimal encoding parameter (namely, a quantization parameter (QP)) for each frame of picture in the video sequence, to be specific, $Q_1^*$ is an optimal encoding parameter for a $1^{st}$ frame of picture, $Q_2^*$ is an optimal encoding parameter for a $2^{nd}$ frame of picture, ..., and $Q_N^*$ is an optimal encoding parameter for an $N^{th}$ frame of picture; and Rc is a target number of encoded bits of the video sequence.

The video sequence may be encoded by an encoder, and an encoded bitstream obtained through encoding usually needs to be transmitted through a communication channel. In actual application, most communication channels are constant bitrate (CBR) channels, and most encoded bitstreams output by an encoder are variable bitrate (VBR) bitstreams. Therefore, to effectively transmit a VBR bitstream in a CBR channel, a buffer may be set in an output part of the encoder. In this way, a basic framework of bitrate control in video encoding is shown in FIG. 1.

Figure 2:
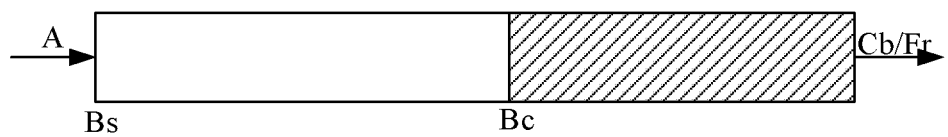
FIG. 2 is a schematic diagram of a buffer.

FIG. 2 is a schematic diagram of a buffer. In FIG. 2, A indicates an encoded bitstream output by a video encoder to the buffer, Bs indicates a size of a buffering region of a buffer, Bc (that is, a filled region in FIG. 2) is the number of to-be-sent bits in the buffering region of the buffer, Cb is channel bandwidth, Fr is an encoding frame rate, and Cb/Fr indicates a volume of data transmitted by a communication channel within duration in which the encoder encodes one frame of picture.

The following describes a principle of a bitrate control algorithm in the conventional technology by using an example.

An objective of bitrate control is to obtain higher video quality with limited bandwidth. To achieve this objective, two issues need to be addressed: first, how to allocate a number of encoded bits; and second, how to efficiently use the allocated number of bits to estimate an optimal encoding parameter. In other words, the bitrate control algorithm usually includes two steps: bit allocation and quantization parameter (QP) estimation. The bit allocation is to allocate limited resources to picture units such as a group of pictures, a frame, and a macro block. The quantization parameter estimation is to estimate, based on a resource (referred to as a resource 0 below, namely, the number of bits) allocated to a picture unit, an optimal encoding parameter corresponding to the resource 0, to minimize distortion of an encoded video.

The bitrate control algorithm requires that an encoded bitstream is suitable for transmission in a bandwidth-limited channel (for example, a CBR channel), and also requires that higher video quality be obtained with limited channel transmission bandwidth. To determine video quality, two aspects usually need to be considered: first, an average PSNR of all frames of an entire sequence, where a video sequence with a higher average PSNR has higher quality; second, a change status of a PSNR curve during encoding of a video sequence, where a video sequence with a smoother PSNR curve has higher quality.

Figure 3:
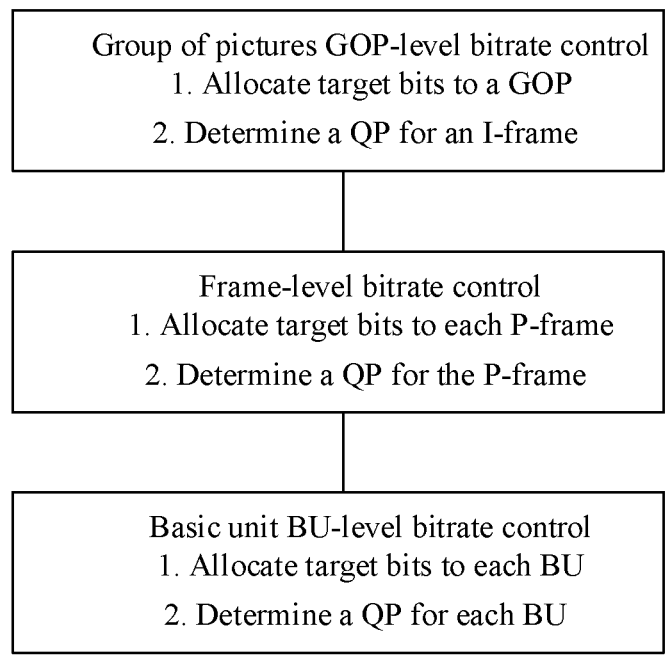
FIG. 3 is a diagram of a general structure of a bitrate control algorithm.

In a conventional bitrate control algorithm, the foregoing two issues are studied at three levels: GOP level, frame level, and BU level. In video encoding, "three-level and two-step" bitrate control is usually performed per GOP, as shown in FIG. 3.

A GOP usually starts with an I-frame encoded through intra-frame prediction, and the I-frame is followed by several P-frames and/or B-frames encoded through inter-frame prediction. The I-frame is a key frame in the GOP and belongs to intra-frame compression. An image of the I-frame is completely retained, and only data of a present frame is required for decoding the I-frame. The P-frame is a forward search frame, and is also referred to as a differential frame or inter-frame compression. An encoded P-frame indicates differential information between a current frame and the I-frame or a P-frame before the current frame. During decoding of the P-frame, an image of the current frame needs to be reconstructed by superposing a buffered image of the P-frame or the I-frame before the current frame with encoded differential information defined in the present frame. The B-frame is a bidirectional differential frame. To be specific, an encoded B-frame records differential information between a present frame (namely, a current frame) and frames before and after the current frame. In other words, to decode the B-frame, a previous buffered image needs to be obtained, and a next image also needs to be decoded, and a picture of the present frame is reconstructed based on encoded data of a previous frame, a next frame, and the present frame.

It can be learned from the foregoing descriptions that a volume of data generated by encoding the I-frame is much greater than a volume of data generated by encoding the P-frame and encoding the B-frame. Therefore, after the I-frame is encoded, the usage Bc of the buffer reaches a high level, and the usage Bc gradually decreases during encoding of the P-frame and the B-frame after the I-frame. After encoding of pictures in the GOP is completed, the usage of the buffer may recover to a level before encoding of the GOP.

In actual implementation, from the GOP level to the BU level, the bitrate control algorithm allocates encoding resources from the top down, and determines a quantization parameter (QP) based on the number of available encoded bits. Details are as follows.

A main task of GOP-level bitrate control is to allocate a number of encoded bits to an entire GOP, and allocation is performed based on the number of frames included in a current GOP, usage of an output buffering region of an encoder, and channel bandwidth. Then a QP for a starting I-frame of the GOP needs to be calculated. A process of calculating the QP for the I-frame is a process of allocating encoding resources between an intra-frame predictive frame and an inter-frame predictive frame. In JVT-G012, a QP for an I-frame of each GOP is calculated based on an average QP for all P-frames in a previous GOP. For a $1^{st}$ GOP, a QP may be selected for an I-frame in the $1^{st}$ GOP based on experience.

Frame-level bitrate control is an important part of video encoding. Both the GOP-level bitrate control and BU-level bitrate control are centered on the frame-level bitrate control. In the frame-level bitrate control, first, encoded bits are allocated in a form of target bits among P-frames in a GOP, and then a QP for a current frame is estimated based on the number of allocated encoded bits.

During allocation of encoded bits in the GOP-level bitrate control and the frame-level bitrate control, a number of encoded bits is allocated between an I-frame and a P-frame and between different P-frames by setting a QP for the I-frame and the number of encoded bits for the P-frames. During QP calculation in the frame-level bitrate control and during the BU-level bitrate control, a main task is to make an actual number of bits generated through encoding match a target number of bits by setting proper QPs for MBs in a frame.

The following describes a bitrate control method in the conventional technology by using a JVT-F086 bitrate control algorithm and a JVT-G012 bitrate control algorithm that are recommended for H.264/AVC video encoding as examples.

JVT-F086 Bitrate Control Algorithm and JVT-G012 Bitrate Control Algorithm

1. The JVT-F086 bitrate control algorithm allocates bits based on a buffer status and an MPEG-2 TM5 bitrate model, to ensure to maximum extent that the buffer neither overflows nor underflows. In the JVT-F086 bitrate control algorithm, first, the number of bits required for encoding a frame of picture needs to be estimated before the frame of picture is encoded, and then a QP is assumed based on a feedback from a buffer, and the frame of picture is encoded based on the QP; and then whether the assumed QP needs to be adjusted is determined based on an actual encoding result of the current frame of picture, and if the assumed QP needs to be adjusted, the QP may be first adjusted, and then the frame of picture is encoded again based on an adjusted QP. That is, in the JVT-F086 bitrate control algorithm, whether a QP is to be re-given needs to be determined during encoding of each frame of picture, and the frame of picture is encoded again based on a re-given QP. As a result, calculation complexity of JVT-F086 is high. In addition, the JVT-F086 bitrate control algorithm controls a bitrate based on saturation of a buffer, and controls the buffer well, and a change of buffer usage is smooth, but quality of an encoded video fluctuates greatly.

2. The JVT-G012 bitrate control algorithm inherits the idea of the MPEG-4 VM8 bitrate control algorithm and follows a quadratic rate distortion model, and can adjust model parameters in a timely manner based on a source feature. Key technologies of the JVT-G012 bitrate control algorithm include a traffic round-trip model, a linear MAD prediction model, the quadratic rate distortion model, and the like. In the JVT-G012 bitrate control algorithm, target encoded bits are allocated to a current frame based on a predefined bitrate, frame rate, filling degree of buffer, and target line of buffer; then a MAD of the current frame of picture is predicted by using a linear tracking theory; and finally, a QP for the current frame of picture is calculated by using the quadratic rate distortion model. The JVT-G012 bitrate control algorithm addresses the QP paradox by using the MAD prediction method. In addition, compared with the JVT-F086 bitrate control algorithm, each to-be-encoded frame of picture needs to be encoded only once, and therefore calculation complexity of the JVT-G012 bitrate control algorithm is lower. Further, the JVT-G012 bitrate control algorithm implements three-level bitrate control at a GOP level, a frame level, and a macro block level, and provides a comprehensive control function.

The following describes in detail a process of implementing three-level bitrate control at the GOP level, the frame level, and the macro block level by the JVT-G012 bitrate control algorithm.

GOP-Level Bitrate Control

For an $i^{th}$ GOP, before a $1^{st}$ frame of picture in the $i^{th}$ GOP is encoded, a target number $Tr(n_{i,0})$ of bits is allocated to the $i^{th}$ GOP based on a channel rate and a buffer status, where $Tr(n_{i,0})$ indicates the number of available/remaining bits in the GOP after a $0^{th}$ frame of picture in the $i^{th}$ GOP is encoded:

$$T_r(n_{i,0}) = \frac{u(n_{i,1})}{F_r} * N_i + \left(\frac{B_s}{8} - B_c(n_{i-1,N_i})\right) \quad (4)$$

In the formula (4), $u(n_{i,1})$ indicates an available channel transmission rate before the $1^{st}$ frame of picture in the $i^{th}$ GOP is encoded, $N_i$ is the number of frames of pictures included in the $i^{th}$ GOP, $B_s$ is a size of a buffering region, $B_c(n_{i-1,N_i})$ indicates actual usage of the buffering region after an $(i-1)^{th}$ GOP is encoded, and $F_r$ indicates an encoding frame rate. After one frame of picture in the $i^{th}$ GOP is encoded, $T_r(n_{i,j})$ is updated once:

$$T_r(n_{i,j}) = T_r(n_{i,j-1}) + \frac{u(n_{i,j}) - u(n_{i,j-1})}{F_r} \times (N_i - j) - A(n_{i,j-1}) \quad (5)$$

In the formula (5), $T_r(n_{i,j})$ indicates the number of remaining and available bits in the $i^{th}$ GOP after a picture $n_{i,j}$ is encoded, $u(n_{i,j})$ indicates an available channel transmission rate before the picture $n_{i,j}$ is encoded, $u(n_{i,j-1})$ indicates an available channel transmission rate before a picture $n_{i,j-1}$ is encoded, $A(n_{i,j})$ is an actual number of encoded bits of the picture $n_{i,j}$, i is a positive integer, and j is an integer greater than 1. For a CBR channel, $u(n_{i,j})=u(n_{i,j-1})$. In this case, the formula (5) may be simplified into a formula (6):

$$T_r(n_{i,j}) = T_r(n_{i,j-1}) + \frac{u(n_{i,j}) - u(n_{i,j-1})}{F_r} \times (N_i - j) - A(n_{i,j-1}) \quad (6)$$

It can be understood that a process of allocating the number of bits to the $i^{th}$ GOP is a process of performing GOP-level bitrate control on the $i^{th}$ GOP. After the GOP-level bitrate control is completed, an initial quantization parameter for the $i^{th}$ GOP further needs to be determined. An initial quantization parameter for a $1^{st}$ (that is, i=1) GOP in a video sequence is a predefined $QP_0$, and both an I-frame and a $1^{st}$ P-frame in the $1^{st}$ GOP are encoded by using $QP_0$.

Initial quantization parameters for an I-frame and a $1^{st}$ P-frame in a GOP in the video sequence other than the $1^{st}$ GOP may be calculated by using the following formula (7):

$$QP_{st}(i) = \frac{\text{Sum}_{PQP}(i-1)}{N_{(i-1)p}} - 1 - \frac{8T_r(n_{i-1,N_{i-1}})}{T_r(n_{i,0})} - \frac{N_{i-1}}{15} \quad (7)$$

In the formula (7), $QP_{st}(i)$ indicates an initial quantization parameter for an $i^{th}$ GOP, $\text{Sum}_{PQP}(i-1)$ indicates a sum of quantization parameters for all P-frames in an $(i-1)^{th}$ GOP, $N_{(i-1)p}$ indicates the number of P-frames in the $(i-1)^{th}$ GOP, $T_r(n_{i-1,N_i})$ indicates the number of bits available in the $(i-1)^{th}$ GOP after a last frame of picture in the $(i-1)^{th}$ GOP is encoded, $T_r(n_{i,0})$ indicates the number of available bits in the $i^{th}$ GOP after a $0^{th}$ frame of picture in the $i^{th}$ GOP is encoded, $N_{i-1}$ indicates the number of frames of pictures included in the $(i-1)^{th}$ GOP, and $N_{(i-1)p}$ indicates the number of P-frames included in the $(i-1)^{th}$ GOP.

Frame-Level Bitrate Control

The frame-level bitrate control includes two stages: a pre-encoding stage and a post-encoding stage.

1. Pre-Encoding Stage

A main task of this stage is to calculate quantization parameters for all encoded frames including a P-frame and a B-frame. The B-frame is usually not used as a reference frame, and a QP for the B-frame may be obtained through simple linear interpolation based on a QP for an adjacent frame. The P-frame serves as a reference frame for a subsequent frame, and a value of a QP for the P-frame needs to be precisely calculated. Therefore, calculation methods for quantization parameters for different frames need to be considered separately.

Calculation of a Quantization Parameter for a B-Frame

Assuming that the number of consecutive B-frames between two adjacent P-frames is E (E is an integer greater than 1) and quantization parameters for the two adjacent P-frames are $QP_1$ and $QP_2$, a quantization parameter for an $i^{th}$ B-frame is calculated in the following two cases:

a. When E=1, that is, there is only one B-frame between two adjacent P-frames, a calculation formula for a quantization parameter $Q\tilde{B}_1$ for the B-frame is a formula (8):

$$Q\tilde{B}_1 = \begin{cases} \frac{QP_1 + QP_2 + 2}{2} & \text{if } QP_1 \neq QP_2 \\ QP_1 + 2 & \text{Otherwise} \end{cases} \quad (8)$$

b. When E>1, that is, there is more than one B-frame between two adjacent P-frames, a calculation formula for a quantization parameter for the B-frame is a formula (9):

$$Q\tilde{B}_i = QP_1 + \alpha + \max\left\{\min\left\{\frac{(QP_2 - QP_1)}{E - 1}, 2(i-1)\right\}, -2(i-1)\right\} \quad (9)$$

In the formula (9), $Q\tilde{B}_1$ is an $i^{th}$ (i is a positive integer) B-frame between the two adjacent P-frames, and $\alpha$ is a difference between a quantization parameter for a $1^{st}$ B-frame between the two adjacent P-frames and a quantization parameter QP for the two adjacent P-frames, and is given by the following formula:

$$\alpha = \begin{cases} -3 & QP_2 - QP_1 \leq -2E - 3 \\ -2 & QP_2 - QP_1 = -2E - 2 \\ -1 & QP_2 - QP_1 = -2E - 1 \\ 0 & QP_2 - QP_1 = -2E \\ 1 & QP_2 - QP_1 = -2E + 1 \\ 2 & \text{Otherwise} \end{cases} \quad (10)$$

In the formula (10), the case of $QP_2 - QP_1 > -2E + 1$ occurs only when a video sequence switches from one GOP to another GOP. With reference to the formula (10), as shown in the following formula (11), a final quantization parameter $QB_i$ for the $i^{th}$ B-frame between the two adjacent P-frames is further adjusted according to the H.264/AVC standard as follows:

$$QB_i = \min\{\max\{Q\tilde{B}_i, 1\}, 51\} \quad (11)$$

For $Q\tilde{B}_i$ in the formula (11), refer to $Q\tilde{B}_i$ in the formula (10).

② Calculation of a Quantization Parameter for a P-Frame (1) A Target Buffer Level is Determined.

Because a quantization parameter for a $1^{st}$ P-frame in a GOP is already given by the GOP, only target buffering region levels of other P-frames in the GOP need to be determined. It can be understood that, after encoding of one P-frame in a $1^{st}$ GOP is completed, an initial level value of a target buffering region may be obtained as follows: $Tbl(n_{i,2})=B_c(n_{i,2})$, where $B_c(n_{i,2})$ is actual usage of the buffering region after a $1^{st}$ P-frame in an $i^{th}$ GOP is encoded. In this case, a target buffering region level for a $j^{th}$ (j is a positive integer) P-frame in the $i^{th}$ GOP is defined as follows:

$$Tbl(n_{i,j+1}) = \qquad (12)$$

$$Tbl(n_{i,j}) - \frac{Tbl(n_{i,2}) - B_s/2}{N_{p(i-1)} - 1} + \frac{\tilde{W}_p(n_{i,j})(L+1)u(n_{i,j})}{F_r(\tilde{W}_p(n_{i,j}) + \tilde{W}_b(n_{i,j})L)} - \frac{u(n_{i,j})}{F_r}$$

In the formula (12), $Tbl(n_{i,j})$ is the target buffering region level for the $j^{th}$ P-frame of picture in the $i^{th}$ GOP, $\tilde{W}_p$ and $\tilde{W}_b$ are average encoding complexity of the P-frame and a B-frame respectively, $u(n_{i,j})$ indicates an available channel transmission rate before the $j^{th}$ frame of picture in the $i^{th}$ GOP is encoded, $B_s$ is a size of the buffering region, and $N_{p(i-1)}$ is the number of P-frames in an $(i-1)^{th}$ GOP. Encoding complexity of a picture may be calculated by using a formula (13):

$$\tilde{W}_p(n_{i,j}) = \frac{W_p(n_{i,j})}{8} + \frac{7 * \tilde{W}_p(n_{i,j+1})}{8} \qquad (13)$$

$$\tilde{W}_b(n_{i,j}) = \frac{W_b(n_{i,j})}{8} + \frac{7 * \tilde{W}_b(n_{i,j+1})}{8}$$

$$W_p(n_{i,j}) = S_p(n_{i,j})Q_p(n_{i,j})$$

$$W_b(n_{i,j}) = \frac{S_b(n_{i,j})Q_b(n_{i,j})}{1.3636}$$

In the formula (13), $S_p$ indicates an actual number of bits generated by encoding all P-frames in the $i^{th}$ GOP, $S_b$ indicates an actual number of bits generated by encoding all B-frames in the $i^{th}$ GOP, $Q_p$ indicates an average quantization parameter for all the P-frames in the $i^{th}$ GOP, and $Q_b$ indicates an average quantization parameter for all the B-frames in the $i^{th}$ GOP. In a case that there is no B-frame between two P-frames, the formula (12) may be simplified into the following formula (14):

$$Tbl(n_{i,j+1}) = Tbl(n_{i,j}) - \frac{Tbl(n_{i,2}) - B_s/8}{N_p - 1} \qquad (14)$$

It can be easily learned from the formula (14) that a value of $Tbl(n_{i,N_{gop}})$ is close to $Bs/8$. Therefore, if actual buffer usage and predetermined buffer usage are exactly the same, it can be ensured that each GOP uses only its own bit overheads. However, due to inaccuracy of the rate distortion model and the linear MAD prediction model, there is usually a difference between the actual buffer usage and the predetermined buffer usage. Therefore, a target number of bits for each frame needs to be obtained through fine adjustment.

(2) A Target Number of Bits for the P-Frame is Calculated.

According to a linear tracking theory, the number $\tilde{f}(n_{i,j})$ of bits allocated to a $j^{th}$ frame in an $i^{th}$ GOP is determined jointly based on target buffer usage, an encoding frame rate, available channel bandwidth, and actual buffer usage:

$$\tilde{f}(n_{i,j}) = \frac{u(n_{i,j})}{F_r} + \gamma(Tbl(n_{i,j}) - B_c(n_{i,j})) \qquad (15)$$

In the formula (15), $\gamma$ is a constant, and has a value of 0.25 when a B-frame is inserted in a GOP, or has a value of 0.75 when no B-frame is inserted in a GOP, $u(n_{i,j})$ indicates an available channel transmission rate when the $j^{th}$ frame of picture in the $i^{th}$ GOP is encoded, $F_r$ is an encoding frame rate, $Tbl(n_{i,j})$ is a target buffering region level for the $j^{th}$ frame of picture in the $i^{th}$ GOP, and $B_c(n_{i,j})$ indicates actual usage of the buffering region after the $j^{th}$ frame of picture in the $i^{th}$ GOP is encoded. In addition, the number $\hat{f}(n_{i,j})$ of remaining bits after the $j^{th}$ frame of picture in the $i^{th}$ GOP is encoded also needs to be considered:

$$\hat{f}(n_{i,j}) = \qquad (16)$$

$$\beta * \frac{W_p(n_{i,j-1})T_r(n_{i,j})}{W_p(n_{i,j-1})N_{p,r}(j-1) + W_b(n_{i,j-1})N_{b,r}(j-1)} + (1-\beta) * \tilde{f}(n_{i,j})$$

In the formula (16), $N_{p,r}(j-1)$ and $N_{b,r}(j-1)$ indicate the number of remaining unencoded P-frames and B-frames in a current GOP respectively. Finally, the number of bits allocated to the $j^{th}$ frame is obtained through weighted summation on $\hat{f}(n_{i,j})$ and $\tilde{f}(n_{i,j})$:

$$f(n_{i,j}) = \beta * \hat{f}(n_{i,j}) + (1-\beta) * \tilde{f}(n_{i,j}) \qquad (17)$$

In the formula (17), when the $i^{th}$ GOP includes a B-frame, a value of $\beta$ is 0.9; or when the $i^{th}$ GOP includes no B-frame, a value of $\beta$ is 0.5.

(3) A Quantization Parameter (QP) for the P-Frame is Calculated, and Rate Distortion Optimization RDO is Performed.

Optionally, a MAD value of a current frame is obtained based on an actual MAD of a previous frame by using the linear prediction model, and then a quantization parameter $\hat{Q}_{pc}(n_{i,j})$ for an $i^{th}$ frame of picture $n_{i,j}$ in a GOP is calculated based on the quadratic rate distortion model, where both i and j are positive integers.

$$f(n_{i,j}) = d_1 \times \frac{MAD_{predict}(n_{i,j})}{\hat{Q}_{pc}(n_{i,j})} + d_2 \times \frac{(MAD_{predict}(n_{i,j}))^2}{(\hat{Q}_{pc}(n_{i,j}))^2} \qquad (18)$$

In the formula (18), $f(n_{i,j})$ is the number of bits allocated to a $j^{th}$ frame of picture in an $i^{th}$ GOP, $d_1$ and $d_2$ are constants, $MAD_{predict}(n_{i,j})$ is a predicted MAD value, and $\hat{Q}_{pc}(n_{i,j})$ is a quantization step calculated by using the rate distortion model, and then may be converted into a quantization parameter (QP).

To ensure continuity of video quality, a difference between quantization parameters for two adjacent frames of pictures should be not greater than 2. Therefore, a quantization parameter for a picture $n_{i,j}$ is adjusted to $\tilde{Q}_{pc}(n_{i,j})$:

$$\tilde{Q}_{pc}(n_{i,j}) = \min\{Q_{pp}(n_{i,j}) + 2, \max\{Q_{pp}(n_{i,j}) - 2, \hat{Q}_{pc}(n_{i,j})\}\} \qquad (19)$$

In the formula (19), $Q_{pp}$ is a quantization parameter of for an $(i-1)^{th}$ frame of picture $n_{i,j}$ in the $i^{th}$ GOP, and the quantization parameter for the picture $n_{i,j}$ is finally limited as follows:

$$Q_{pc} = \min\{51, \max\{\tilde{Q}_{pc}, 1\}\} \qquad (20)$$

2. Post-Encoding Stage

There are three main tasks in this stage: updating a parameter in the linear prediction model, updating a parameter in the quadratic rate distortion model, and determining the number of skipped frames.

Specifically, the parameter in the linear prediction model and the parameter in the quadratic rate distortion model may be updated based on an error between a predicted MAD value of a picture $n_{i,j}$ and an actual MAD value of the picture $n_{i,j}$.

After encoding of a frame of picture (for example, the picture $n_{i,j}$) is completed, predicted buffer usage (which may also be referred to as new buffer usage or predicted buffer usage) is determined by an actual number $A(n_{i,j})$ of bits generated by the picture $n_{i,j}$, current buffer usage, and a volume of data that can be transmitted by a channel within duration in which an encoder encodes a frame. When consecutive high-complexity encoded frames appear, a frame skipping technology needs to be used to avoid excessively high new buffer usage or even overflow. The number of skipped frames $N_{post}$ is initially set to 0, and then continuously increases until the following condition is met:

$$B_c(n_{i,j+N_{post}}) < B_s * 0.8 \tag{21}$$

In the formula (21), $B_c(n_{i,j+N_{post}})$ indicates predicted buffer usage after a picture $n_{i,j+N_{post}}$ is encoded, j indicates a frame number at which frame skipping starts, and $j+N_{post}$ indicates a frame of picture that needs to be discarded.

Buffer usage may be calculated by using the following formula (22):

$$B_c(n_{i,j+l+1}) = B_c(n_{i,j+1}) - u(n_{i,j+1})/F_r; 1 \leq l < N_{post} \tag{22}$$

In the formula (22), j indicates a frame number at which frame skipping starts, and l is a positive integer.

To sum up, it can be learned from the formula (12) to the formula (17) that, if a GOP does not include a B-frame, the JVT-G012 bitrate control algorithm does not consider encoding complexity between P-frames at a frame level during bit allocation. To be specific, it is assumed that encoding complexity of P-frames in a same GOP is the same, and encoding resources are equally allocated to the P-frames. However, in an actual video sequence, encoding complexity of each frame varies with a magnitude and an amount of motion included in each frame, and the average allocation policy not only causes fluctuation of a PSNR curve of each frame in the GOP, but also leads to a decrease of an average PSNR of the entire sequence. This degrades quality of entire video encoding.

In bitrate control, accurate estimation for encoding complexity of a controlled object is a basis for proper and effective resource allocation. In the JVT-G012, it is assumed that encoding complexity of P-frames in a same GOP is the same, and encoding resources equally allocated to the P-frames. In an actual video, encoding complexity of each frame of picture in the video varies with a magnitude and an amount of motion included in each frame of picture, and the average allocation policy causes fluctuation of quality of a compressed video. To resolve the foregoing problems, the embodiments of this application propose a video encoding method based on encoding complexity, to optimize the step of calculating the number of bits of a P-frame in the frame-level bitrate control in the JVT-G012 method.

Specifically, in the video encoding method provided in the embodiments of this application, frame-level bit allocation is performed within a group of picture GOP of a to-be-encoded video based on encoding complexity, encoded bits used for low-complexity frame encoding are saved, and are used for high-complexity frame encoding. This can alleviate fluctuation of a PSNR curve of each frame of picture in the group of pictures while keeping an average encoding bitrate close to a target bitrate, and therefore can improve quality of an encoded video.

To make image quality of encoded frames of pictures in a video sequence closer to each other, an appropriate number of encoded bits needs to be allocated to each frame of picture based on encoding complexity. The bit allocation is usually performed within each GOP. To allocate bits among different pictures in a same GOP, relative encoding complexity between the pictures needs to be known, and a weighting parameter is calculated based on the relative encoding complexity to correct the number of bits allocated according to the average allocation policy in the frame-level bitrate control of the JVT-G012.

Figure 4:
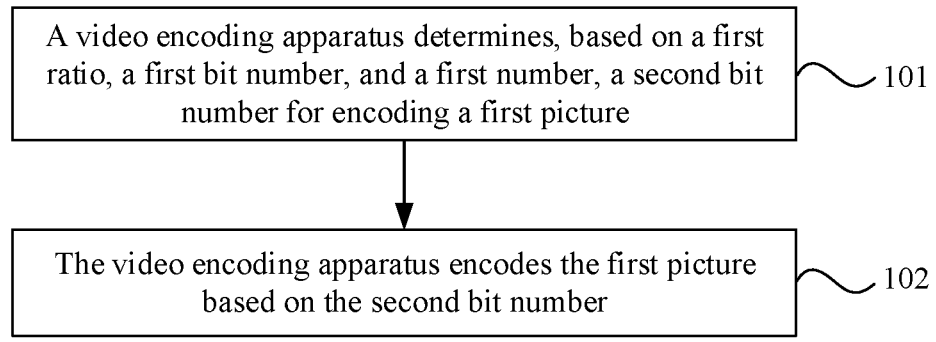
FIG. 4 is a flowchart of a video encoding method according to an embodiment of this application.

An embodiment of this application provides a video encoding method. As shown in FIG. 4, the method may include the following step 101 and step 102. The method is described by using an example in which a video encoding apparatus is an execution entity.

Step 101: The video encoding apparatus determines, based on a first ratio, a first bit number, and a first number, a second bit number for encoding a first picture.

Step 102: The video encoding apparatus encodes the first picture based on the second bit number.

The first ratio is a ratio of predicted encoding complexity of the first picture to actual encoding complexity of M frames of second pictures. The first picture is an unencoded first frame of picture in a target group of pictures. The M frames of second pictures are encoded pictures in the target group of pictures. The first bit number is the number of remaining bits in the target group of pictures. The first number is the number of unencoded pictures in the target group of pictures. M may be an integer greater than 1.

In this embodiment of this application, the second bit number is the number of bits configured by the video encoding apparatus to the first picture, that is, the second bit number is a target number of bits of the first picture.

In this embodiment of this application, the first ratio may be used for indicating relative encoding complexity of the to-be-encoded first picture relative to the encoded M frames of second pictures in the target group of pictures.

It should be noted that the first picture, the M second pictures, and the first number are determined based on an encoding progress of the target group of pictures.

For example, it is assumed that the target group of pictures includes 10 frames of pictures: picture 1, picture 2, picture 3, picture 4, picture 5, picture 6, picture 7, picture 8, picture 9, and picture 10, where picture 3 is a most recently encoded picture. In this case, the first picture is picture 4, the M (M=3) second pictures include picture 1, picture 2, and picture 3, and the first number is 7. In addition, after encoding of the to-be-encoded picture 4 is completed, picture 5 becomes the $1^{st}$ frame of picture unencoded in the target group of pictures. Therefore, the video encoding apparatus may use picture 5 as a new first picture, and perform step 101 and step 102 again, and so on, until encoding of picture 10 is completed. Then the video encoding apparatus may continue to encode a next group of pictures.

In the video encoding method provided in this embodiment of this application, the first ratio may indicate relative encoding complexity between the first picture and the encoded M frames of second pictures in the target group of pictures. To be specific, in the video encoding method provided in this embodiment of this application, the number of bits for encoding a to-be-encoded picture may be determined based on relative encoding complexity between the to-be-encoded picture and an encoded picture in the target group of pictures, the number of remaining bits in the target group of pictures, and the number of remaining frames in the target group of pictures. Therefore, encoded bits used for a picture with low encoding complexity in the target group of pictures can be saved, and the saved encoded bits are used for encoding a picture with high encoding complexity. This can alleviate fluctuation of a PSNR curve of each frame of picture in the group of pictures while keeping an average encoding bitrate close to a target bitrate (an average encoding bitrate), and therefore can improve quality of an encoded video.

Optionally, in this embodiment of this application, step 101 may be specifically implemented by the following step 101a and step 101b.

Step 101a: The video encoding apparatus determines, based on the first ratio, a weighting parameter corresponding to the first ratio.

Optionally, it is assumed that the target group of pictures is an $i^{th}$ GOP in a video that needs to be encoded, the first picture is a $j^{th}$ frame of picture in the target group of pictures, and the first ratio is $MAD_{radio}(n_{i,j})$. In this case, the weighting parameter $W_{MAD}(n_{i,j})$ may be calculated by using the following formula (23):

$$W_{MAD}(n_{i,j}) = a + b \cdot (MAD_{ratio}(n_{i,j}) - a) \tag{23}$$

In the formula (23), a and b are two encoding parameters specified based on available channel resources (for example, an available channel transmission rate before the first picture is encoded) and encoding complexity of the target group of pictures, a indicates average encoding complexity of the target group of pictures, and b is an adjustment range for the weighting parameter $W_{MAD}(n_{i,j})$.

Optionally, in this embodiment of this application, a and b in the formula (23) are constants. For example, a=1.1, and b=3.5. Certainly, in actual implementation, a and b may alternatively be other values. For example, a=1.1±0.5, and b=3.5±1.

Considering the limitation of a buffer size Bs, value of the weighting parameter $W_{MAD}(i)$ needs to be further constrained:

$$W_{MAD}(n_{i,j}) = \min\{S_{high}, \max\{S_{low}, W_{MAD}(n_{i,j})\}\} \tag{24}$$

In the formula (24), $S_{high}$ indicates an upper limit of an adjustment range for the buffer, and is used to avoid excessively high encoding resource usage of a high-complexity frame. $S_{low}$ indicates a lower limit of the adjustment range for the buffer, and is used to avoid degradation of video quality caused by excessively low encoding resource usage of a low-complexity frame.

It can be understood that an excessively large value of $S_{high}$ leads to excessively high encoding resource usage of a high-complexity picture and affects encoding quality of a subsequent frame, and an excessively small value of $S_{high}$ limits encoding resources allocated to a high-complexity picture and affects improvement of encoding quality of the picture. An excessively large value of $S_{low}$ affects resource saving during encoding of a low-complexity picture, and an excessively small value of $S_{low}$ may cause sharp degradation of encoding quality because too few encoding resources are allocated to some pictures.

Optionally, in this embodiment of this application, values of $S_{high}$ and $S_{low}$ may be constants. For example, $S_{high}$=1.5, and $S_{low}$=0.45.

Step 101b: The video encoding apparatus determines, based on the weighting parameter, the first bit number, and the first number, the second bit number for encoding the first picture.

Optionally, in this embodiment of this application, it is assumed that the target group of pictures is an $i^{th}$ GOP in a video that needs to be encoded, and the target first picture is an $i^{th}$ frame of picture in the group of pictures. In this case, the second number $Tc(n_{i,j})$ of bits for encoding the first picture $n_{i,j}$ is as follows:

$$Tc(n_{i,j}) = W_{MAD}(n_{i,j}) \times \frac{Tr(n_{i,j})}{G(n_{i,j})} \tag{25}$$

In the formula (25), $Tr(n_{i,j})$ is the number of remaining and available bits in the target group of pictures before the first picture is encoded, $G(n_{i,j})$ is a total number of unencoded frames in the target group of pictures before the first picture is encoded, and $W_{MAD}(n_{i,j})$ is a weighting parameter corresponding to the first bit number.

In this embodiment of this application, the weighting parameter corresponding to the first ratio indicating relative encoding complexity between the first picture and an encoded picture in the target group of pictures may be determined first, and then the number of bits for encoding the first picture is determined based on the weighting parameter, the number of remaining bits, and the number of unencoded pictures. That is, the number of bits for encoding a picture may be determined based on relative encoding complexity between frames of pictures in the group of pictures. Therefore, compared with a solution in which the number of bits for encoding a picture is determined by using an equal allocation method, in the video encoding method provided in this embodiment of this application, fluctuation of inter-frame video quality after encoding can be better suppressed.

Optionally, in this embodiment of this application, the number of bits for encoding a to-be-encoded picture (for example, the first picture) may be determined based on relative encoding complexity between the to-be-encoded picture and an encoded picture, the number of remaining bits, the number of remaining frames, and a buffer status. This can avoid overflow and underflow of buffer usage.

Optionally, in this embodiment of this application, step 101 may be specifically implemented by the following step 101c.

Step 101c: The video encoding apparatus determines, based on the first ratio, the first bit number, the first number, and target parameters, the second bit number for encoding the first picture.

The target parameters include estimated usage of a buffering region, actual usage of the buffering region, an encoding frame rate, and an available channel transmission rate before the first picture is encoded. For a CBR channel, an available channel transmission rate before each frame of picture is encoded remains the same.

In this embodiment of this application, the second bit number for encoding the first picture may be determined based on the first ratio, the first bit number, the first number, and the target parameter. Therefore, fluctuation of inter-frame encoding quality is suppressed, and overflow or underflow of buffer usage can be avoided. This can further improve quality of an encoded video.

Optionally, in this embodiment of this application, step 101c may be specifically implemented by the following step A and step B.

Step A: The video encoding apparatus determines a third bit number based on the first ratio, the first bit number, and the first number.

It can be understood that, in step A, the number of bits for encoding the first picture is determined based on relative encoding complexity between pictures in the target group of pictures.

In this embodiment of this application, the video encoding apparatus may first determine, based on the first ratio, the weighting parameter corresponding to the first ratio, and then determine the third bit number based on the weighting parameter, the first bit number, and the first number. Refer to the formula (25). Specifically, refer to related descriptions of step 101a and step 101b. To avoid repetition, details are not described herein again.

Step B: The video encoding apparatus determines a fourth bit number based on the target parameters.

It can be understood that, in this embodiment of this application, the fourth bit number is the number, determined based on usage of an encoder, of bits for encoding the first picture.

For example, assuming that the first picture is a $j^{th}$ frame of picture in an $i^{th}$ group of pictures, to avoid overflow and underflow of the encoder, the fourth number $\tilde{T}c(n_{i,j})$ of bits for encoding a current frame may be determined based on buffer usage of the encoder:

$$\tilde{T}c = \frac{u(n_{i,j})}{F_r} + \gamma_1(Tbl(n_{i,j}) - B_c(n_{i,j})) \quad (26)$$

In the formula (26), $u(n_{i,j})$ indicates an available channel transmission rate before the first picture is encoded, $F_r$ is an encoding frame rate, and $\gamma_1$ is a constant with a value of 0.75.

Step C: The video encoding apparatus performs weighted summation on the third bit number and the fourth bit number to obtain the second bit number.

There is a contradiction between ensuring a steady decrease of buffering region usage of the encoder and improving quality of an encoded video. A root cause of the contradiction lies in different encoding complexity of frames in a video sequence. To achieve video quality consistent with that of a picture with low relative encoding complexity, a picture with high relative encoding complexity requires more encoding resources. Therefore, comprehensively considering buffer usage and quality of an encoded video, it can be determined that a final number of bits for encoding the first picture is $Tc(n_{i,j})$. Details are as follows:

$$\hat{T}c(n_{i,j}) = \beta_1 * Tc(n_{i,j}) + (1-\beta_1) * \tilde{T}c(n_{i,j}) \quad (27)$$

In the formula (27), $\hat{T}c(n_{i,j})$ is a finally determined number of bits for encoding the first picture, $Tc(n_{i,j})$ is the number, determined based on relative encoding complexity, of bits for encoding the first picture (refer to the formula (25)), $\tilde{T}c(n_{i,j})$ is the number, determined based on buffer usage of the encoder, of bits for encoding the first picture (refer to the formula (26)), and $\beta_1$ is a weighting parameter, where the parameter determines the extent to which both aspects are considered during determining of the number of bits for encoding a picture. $\beta_1$ is a constant within a value range of $\beta_1 \subset [0.5, 0.7]$.

In this embodiment of this application, the third bit number for encoding the first picture may be determined based on the relative encoding complexity, the fourth bit number for encoding the first picture may be determined based on the buffer usage, and a weighted sum of the third bit number and the fourth bit number is used as the final number of bits for encoding the first picture. This can not only improve quality of an encoded high-complexity picture, but also improve smoothness of a PSNR curve of each frame of picture in a target group of pictures and alleviate fluctuation of the PSNR curve, so that an average PSNR of an entire video sequence after encoding can be increased. In this way, quality of an encoded video can be improved.

Optionally, in this embodiment of this application, step 102 may be specifically implemented by the following step 102a and step 102b.

Step 102a: The video encoding apparatus determines a quantization parameter (referred to as a target quantization parameter below) for the first picture based on the second bit number and the predicted encoding complexity of the first picture by using a quadratic rate distortion model.

Step 102b: The video encoding apparatus encodes the first picture based on the target quantization parameter.

Optionally, the predicted encoding complexity of the first picture is indicated by a predicted MAD value of the first picture. The predicted MAD value of the first picture is obtained through prediction based on an actual MAD value of a previous frame of picture (referred to as a third picture below) of the first picture by using a linear prediction model. Then the target quantization parameter is predicted based on the predicted encoding complexity of the first picture and actual encoding complexity of the third picture by using the quadratic rate distortion model.

Specifically, it is assumed that the first picture is a $j^{th}$ frame of picture in an $i^{th}$ group of pictures in a video that needs to be encoded, and both i and j are positive integers. In this case, the target quantization parameter $\hat{Q}_{pc}(n_{i,j})$ may be predicted by using the following formula (28):

$$f(n_{i,j}) = d_1 \times \frac{MAD_{predict}(n_{i,j})}{\hat{Q}_{pc}(n_{i,j})} + d_2 \times \frac{(MAD_{predict}(n_{i,j}))^2}{(\hat{Q}_{pc}(n_{i,j}))^2} \quad (28)$$

In the formula (28), $f(n_{i,j})$ is the number of bits for encoding the first picture, $d_1$ and $d_2$ are parameters of the quadratic rate distortion model, $d_1$ and $d_2$ are constants, and $MAD_{predict}(n_{i,j})$ indicates the predicted encoding complexity of the first picture.

To ensure continuity of quality of an encoded video, a difference between quantization parameters for two adjacent frames of pictures should be not greater than a0 (for example, a0=2). Therefore, the target quantization parameter is adjusted to $\tilde{Q}_{pc}(n_{i,j})$:

$$\tilde{Q}_{pc}(n_{i,j}) = \min\{Q_{pp}(n_{i,j})+2, \max\{Q_{pp}(n_{i,j})-2, \hat{Q}_{pc}(n_{i,j})\}\} \quad (29)$$

In the formula (29), $Q_{pp}$ is a quantization parameter for the third picture (which may be obtained by encoding the third picture). In this way, the target quantization parameter is finally limited as follows:

$$Q_{pc} = \min\{51, \max\{\tilde{Q}_{pc}, 1\}\} \quad (30)$$

In this embodiment of this application, a method for encoding, by the video encoding apparatus, the first picture based on the target quantization parameter may vary when a basic unit (BU) used for encoding varies. Specifically, when the basic unit (BU) is one frame of picture, the video encoding apparatus may directly encode the first picture by using the target quantization parameter. When the basic unit (BU) is at least one macro block and the number of the at least one macro block is less than the number of macro blocks included in one frame of picture, the video encoding apparatus needs to perform basic-level (namely, Bu-level) bitrate control after performing step 102a.

The following describes an example of a method for performing BU-level bitrate control by the video encoding apparatus.

For an I-frame and a B-frame in a group of pictures, all macro blocks (MBs) in a frame of picture are encoded by using a same quantization parameter, for example, are all encoded using a quantization parameter for the picture. Therefore, a main target of the BU-level bitrate control is a P-frame in the group of pictures.

For each P-frame in the group of pictures, the number of bits allocated to a P-frame needs to be first allocated to each BU in the P-frame. Because MAD values (namely, encoding complexity) of unencoded basic units in a current P-frame is unknown, the number of remaining and available bits in the current P-frame may be equally allocated to the unencoded basic units in the current P-frame.

A BU-level bitrate control algorithm may include the following five steps.

Step 1: Calculate a target number of bits of a to-be-encoded BU, that is, allocate a number of bits to the to-be-encoded BU.

Specifically, for an $i^{th}$ (i is an integer greater than 1) frame of picture in the target group of pictures, it is assumed that the number of remaining bits in the $i^{th}$ frame of picture is $f_{rb}(n_{i,j})$, and the number of remaining BUs is $N_{ub}$, where initial values of $f_{rb}(n_{i,j})$ and $N_{ub}$ are $f(n_{i,j})$ and $N_{unit}$, $f(n_{i,j})$ is a total number of bits allocated to the $i^{th}$ frame of picture, and $N_{unit}$ is the total number of BUs in the $i^{th}$ frame of picture. In this case, the number of bits allocated to a $1^{st}$ unencoded BU in the $i^{th}$ frame of picture is $f_{rb}/N_{ub}$.

Step 2: Calculate an estimated number $m_h$ of bits of a $c^{th}$ BU in the $i^{th}$ frame of picture, where c is a positive integer, and the $c^{th}$ BU is the $1^{st}$ unencoded BU in the $i^{th}$ frame of picture.

$$\tilde{m}_{h,c} = \tilde{m}_{h,c-1} \times \left(1 - \frac{1}{c}\right) + \frac{\hat{m}_{h,c}}{c} \quad (31)$$

$$m_h = \tilde{m}_{h,z} \times \frac{c}{N_{unit}} + m_h \times \left(1 - \frac{c}{N_{unit}}\right)$$

In the formula (31), c=1,2 . . . , . . . Nunit, $\hat{m}_{h,c}$ is an actual number of encoded bits of an encoded $c^{th}$ BU in a picture 0, $\tilde{m}_{h,c-1}$ is an average number of encoded bits of the first c−1 encoded BUs in the picture 0, and c is a positive integer.

Step 3: Calculate the number $R_i(c)$ of encoded bits of a residual coefficient for the $c^{th}$ BU in the $i^{th}$ frame of picture:

$$R_i(c) = \frac{f_{rb}}{N_{ub}} - m_h \quad (32)$$

Step 4: Predict a MAD value of the $c^{th}$ BU in the $i^{th}$ picture based on a MAD value of a target BU (namely, a predicted MAD value of the $c^{th}$ BU) and the linear MAD prediction model, where the target BU is a BU, in the $(i-1)^{th}$ frame of picture, whose position corresponds to a position of the $c^{th}$ BU in the $i^{th}$ frame of picture, and encoding of the target BU is completed. Then calculate an encoding quantization step based on the predicted MAD value of the $c^{th}$ BU by using a binomial rate distortion model, where the binomial rate distortion model is as follows:

$$R_i(j) = c_1 \times \frac{\sigma_i(j)}{Q_{step,i}(j)} + c_2 \times \frac{\sigma_i^2(j)}{Q_{step,i}^2(j)} \quad (33)$$

In the formula (33), $\sigma_i(c)$ is the predicted MAD value of the $c^{th}$ BU, and $Q_{step,i}(j)$ is the quantization step calculated by the binomial rate distortion model. The quantization step may be converted into a quantization parameter (QP). This may be specifically determined according to an actual use requirement.

Step 5: Encode all macro blocks in the $c^{th}$ BU based on the calculated quantization parameter for rate distortion optimization, and after the encoding is completed, update the number of remaining bits of the $i^{th}$ frame of picture, a parameter of the linear MAD prediction model, and a parameter of the binomial rate distortion model. Specifically, refer to related descriptions in the foregoing embodiments.

Optionally, in this embodiment of this application, before step 101, the video encoding method provided in this embodiment of this application may further include the following step 103.

Step 103: The video encoding apparatus determines the first ratio based on the predicted encoding complexity of the first picture and average encoding complexity of the M frames of second pictures.

In this embodiment of this application, the predicted encoding complexity of the first picture is indicated by the predicted MAD value of the first picture, and the average encoding complexity of the M frames of second pictures may be indicated by an average MAD value of the M second pictures. Therefore, the first ratio $MAD_{ratio}(j)$ may be calculated by using the following formula (26):

$$MAD_{ratio}(j) = \frac{MAD_{predict}(j)}{\frac{1}{j-1}\sum_{o=0}^{j-1}MAD_{actual}(o)} \quad (34)$$

In the formula (34), $MAD_{ratio}(j)$ is a $MAD_{ratio}$ value of a $j^{th}$ P-frame in a current GOP, $MAD_{predict}(j)$ is a MAD value, predicted by the linear MAD prediction model, of a $j^{th}$ P-frame, and $MAD_{actual}(o)$ is an actual MAD value calculated after encoding of an $o^{th}$ frame in the current GOP (for example, the target group of pictures) is completed.

$$\frac{1}{j-1}\sum_{o=0}^{j-1}MAD_{actual}(o)$$

indicates average encoding complexity of the first j−1 encoded P-frames in the target group of pictures.

In this embodiment of this application, during bit allocation for a frame of picture, average encoding complexity of encoded pictures in a GOP to which the picture belongs may be considered. This can ensure that video quality of encoded pictures in a same GOP is closer to each other, and therefore can alleviate fluctuation of a peak signal-to-noise ratio curve of each frame of picture in a same GOP, and improve quality of an encoded video.

It should be noted that the video encoding method provided in the embodiments of this application may be performed by a video encoding apparatus, or by a control module that is in the video encoding apparatus and that is configured to perform the video encoding method. In the embodiments of this application, a video encoding apparatus provided in the embodiments of this application is described by using an example in which the video encoding apparatus performs the video encoding method.

Figure 5:
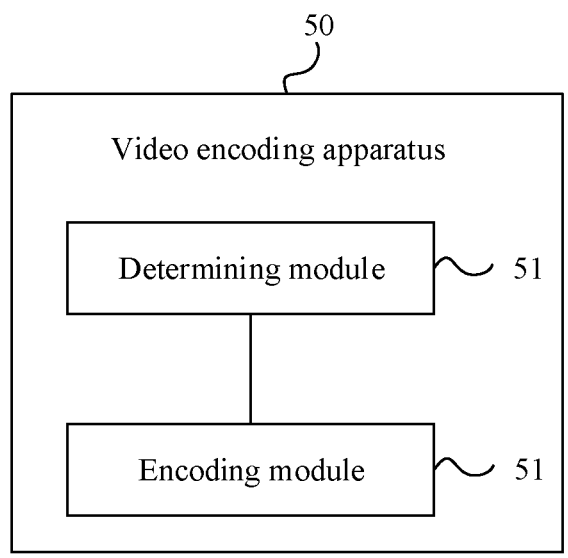
FIG. 5 is a schematic diagram of a video encoding apparatus according to an embodiment of this application.

FIG. 5 is a schematic diagram of a possible structure of a video encoding apparatus for implementing the embodiments of this application. As shown in FIG. 5, the video encoding apparatus 50 may include a determining module 51 and an encoding module 52. The determining module 51 may be configured to determine, based on a first ratio, a first bit number, and a first number, a second bit number for encoding a first picture. The encoding module 52 may be configured to encode the first picture based on the second bit number that is determined by the determining module 51. The first ratio may be a ratio of predicted encoding complexity of the first picture to actual encoding complexity of M frames of second pictures. The first picture is an unencoded first frame of picture in a target group of pictures. The M frames of second pictures are encoded pictures in the target group of pictures, the first bit number is the number of remaining bits in the target group of pictures. The first number is the number of unencoded pictures in the target group of pictures. M is an integer greater than 1.

Optionally, in this embodiment of this application, the determining module 51 may be specifically configured to: determine, based on the first ratio, a weighting parameter corresponding to the first ratio; and determine, based on the weighting parameter, the first bit number, and the first number, the second bit number for encoding the first picture.

Optionally, in this embodiment of this application, the determining module 51 may be specifically configured to determine, based on the first ratio, the first bit number, the first number, and target parameters, the second bit number for encoding the first picture, where the target parameters include estimated usage of a buffering region, actual usage of the buffering region, an encoding frame rate, and an available channel transmission rate before the first picture is encoded.

Optionally, in this embodiment of this application, the determining module 51 may include a first determining sub-module and a processing sub-module. The first determining sub-module may be configured to determine a third bit number based on the first ratio, the first bit number, and the first number, and determine a fourth bit number based on the target parameters. The processing sub-module may be configured to perform weighted summation on the third bit number and the fourth bit number that are determined by the first determining sub-module, to obtain the second bit number.

Optionally, in this embodiment of this application, the encoding module 52 may include a second determining sub-module and an encoding sub-module.

The second determining sub-module may be configured to determine a quantization parameter for the first picture based on the second bit number and the predicted encoding complexity of the first picture by using a quadratic rate distortion model.

The encoding sub-module may be configured to encode the first picture based on the quantization parameter determined by the second determining sub-module.

Optionally, in this embodiment of this application, the determining module 51 may be further configured to: before determining, based on the first ratio, the first bit number, and the first number, the second bit number for encoding the first picture, determine the first ratio based on the predicted encoding complexity of the first picture and average encoding complexity of the M frames of second pictures.

In the video encoding apparatus provided in this embodiment of this application, the first ratio may indicate relative encoding complexity between the first picture and the encoded M frames of second pictures in the target group of pictures. To be specific, in the video encoding method provided in this embodiment of this application, the number of bits for encoding a to-be-encoded picture may be determined based on relative encoding complexity between the to-be-encoded picture and an encoded picture in the target group of pictures, the number of remaining bits in the target group of pictures, and the number of remaining frames in the target group of pictures. Therefore, encoded bits used for a picture with low encoding complexity in the target group of pictures can be saved, and the saved encoded bits are used for encoding a picture with high encoding complexity. This can alleviate fluctuation of a PSNR curve of each frame of picture in the group of pictures while keeping an average encoding bitrate close to a target bitrate (an average encoding bitrate), and therefore can improve quality of an encoded video.

For beneficial effects of the implementations in this embodiment, refer to beneficial effects of corresponding implementations in the method embodiments. To avoid repetition, details are not described herein again.

The video encoding apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, a vehicle-mounted electronic device, a wearable device, an ultra-mobile personal computer (UMPC), a netbook, or a personal digital assistant (PDA), and the non-mobile electronic device may be a network attached storage (NAS), a personal computer (PC), a television (TV), a teller machine, or a self-service machine. This is not specifically limited in this embodiment of this application.

The video encoding apparatus in this embodiment of this application may be an apparatus with an operating system. The operating system may be an Android operating system, may be an iOS operating system, or may be another possible operating system. This is not specifically limited in the embodiments of this application.

The video encoding apparatus provided in this embodiment of this application is capable of implementing the processes implemented in the method embodiments of FIG. 1 to FIG. 4. To avoid repetition, details are not described herein again.

Figure 6:
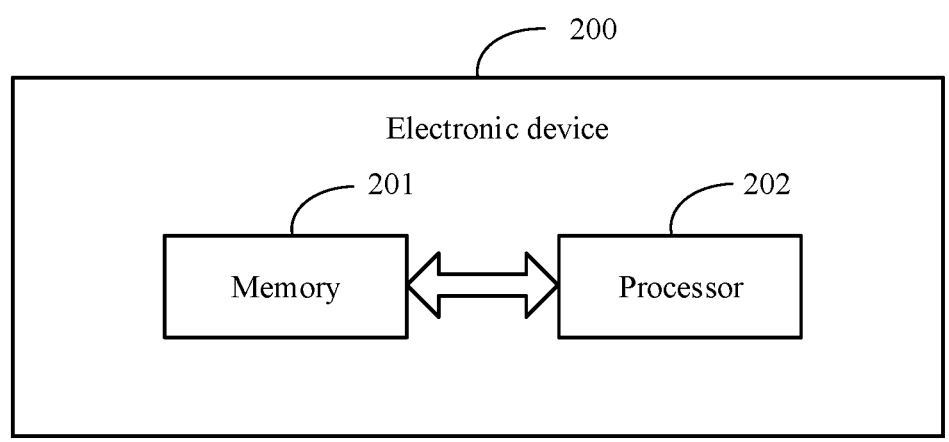
FIG. 6 a schematic diagram of an electronic device according to an embodiment of this application.

As shown in FIG. 6, an embodiment of this application further provides an electronic device 200, including a processor 202, a memory 201, and a program or instructions stored in the memory 201 and capable of running on the processor 202. When the program or instructions are executed by the processor 202, the processes of the foregoing video encoding method embodiments are implemented, with the same technical effects achieved. To avoid repetition, details are not described herein again.

It should be noted that the electronic device in this embodiment of this application includes the foregoing mobile electronic device and non-mobile electronic device.

Figure 7:
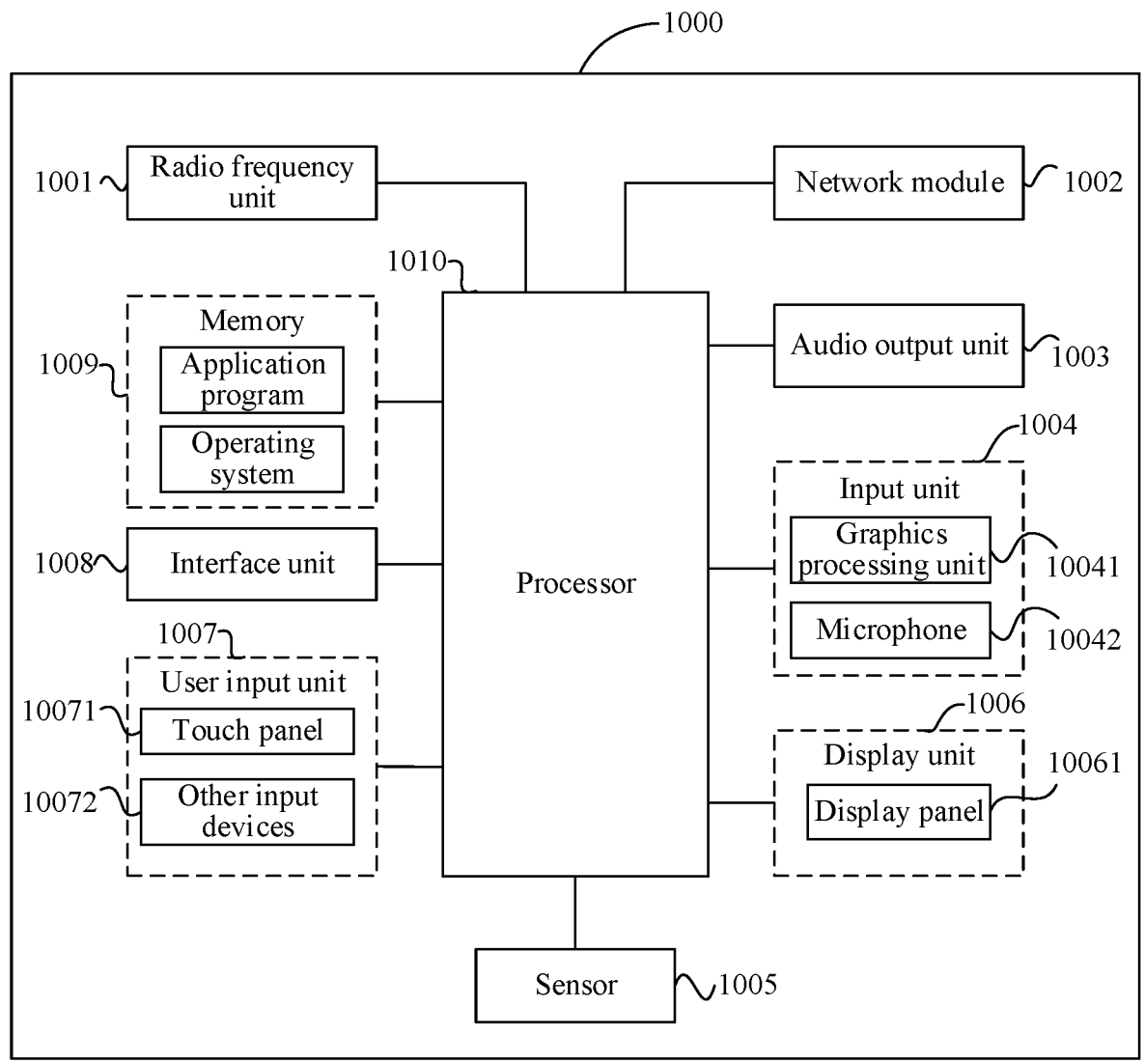
FIG. 7 is a schematic diagram of hardware of an electronic device according to an embodiment of this application.

FIG. 7 is a schematic diagram of a hardware structure of an electronic device according to an embodiment of this application.

As shown in FIG. 7, the electronic device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

Those skilled in the art can understand that the electronic device 1000 may further include a power supply (for example, a battery) that supplies power to various components. The power supply may be logically connected to the processor 1010 through a power management system, so that functions such as charge and discharge management and power consumption management are implemented by using the power management system. The structure of the electronic device shown in FIG. 7 does not constitute a limitation on the electronic device. The electronic device may include more or fewer components than those shown in the figure, or some components may be combined, or there may be a different component layout. Details are not described herein again.

The processor 1010 may be configured to: determine, based on a first ratio, a first bit number, and a first number, a second bit number for encoding a first picture; and encode the first picture based on the second bit number, where the first ratio may be a ratio of predicted encoding complexity of the first picture to actual encoding complexity of M frames of second pictures, the first picture is an unencoded first frame of picture in a target group of pictures, the M frames of second pictures are encoded pictures in the target group of pictures, the first bit number is the number of remaining bits in the target group of pictures, the first number is the number of unencoded pictures in the target group of pictures, and M is an integer greater than 1.

Optionally, in this embodiment of this application, the processor 1010 may be specifically configured to: determine, based on the first ratio, a weighting parameter corresponding to the first ratio; and determine, based on the weighting parameter, the first bit number, and the first number, the second bit number for encoding the first picture.

Optionally, in this embodiment of this application, the processor 1010 may be specifically configured to determine, based on the first ratio, the first bit number, the first number, and target parameters, the second bit number for encoding the first picture, where the target parameters include estimated usage of a buffering region, actual usage of the buffering region, an encoding frame rate, and an available channel transmission rate before the first picture is encoded.

Optionally, in this embodiment of this application, the processor 1010 may be configured to: determine a third bit number based on the first ratio, the first bit number, and the first number; determine a fourth bit number based on the target parameters; and perform weighted summation on the third bit number and the fourth bit number to obtain the second bit number.

Optionally, in this embodiment of this application, the processor 1010 may be configured to determine a quantization parameter for the first picture based on the second bit number and the predicted encoding complexity of the first picture by using a quadratic rate distortion model, and encoding the first picture based on the quantization parameter.

Optionally, in this embodiment of this application, the processor 1010 may be further configured to: before determining, based on the first ratio, the first bit number, and the first number, the second bit number for encoding the first picture, determine the first ratio based on the predicted encoding complexity of the first picture and average encoding complexity of the M frames of second pictures.

In the video encoding apparatus provided in this embodiment of this application, the first ratio may indicate relative encoding complexity between the first picture and the encoded M frames of second pictures in the target group of pictures. To be specific, in the video encoding method provided in this embodiment of this application, the number of bits for encoding a to-be-encoded picture may be determined based on relative encoding complexity between the to-be-encoded picture and an encoded picture in the target group of pictures, the number of remaining bits in the target group of pictures, and the number of remaining frames in the target group of pictures. Therefore, encoded bits used for a picture with low encoding complexity in the target group of pictures can be saved, and the saved encoded bits are used for encoding a picture with high encoding complexity. This can alleviate fluctuation of a PSNR curve of each frame of picture in the group of pictures while keeping an average encoding bitrate close to a target bitrate (an average encoding bitrate), and therefore can improve quality of an encoded video.

For beneficial effects of the implementations in this embodiment, refer to beneficial effects of corresponding implementations in the method embodiments. To avoid repetition, details are not described herein again.

It should be understood that, in this embodiment of this application, the input unit 1004 may include a graphics processing unit (GPU) 10041 and a microphone 10042. The graphics processing unit 10041 processes image data of a static picture or a video that is obtained by an image capture apparatus (for example, a camera) in a video capture mode or an image capture mode. The display unit 1006 may include a display panel 10061. The display panel 10061 may be configured in a form of a liquid crystal display, an organic light-emitting diode, or the like. The user input unit 1007 includes a touch panel 10071 and other input devices 10072. The touch panel 10071 is also referred to as a touchscreen. The touch panel 10071 may include two parts: a touch detection apparatus and a touch controller. The other input devices 10072 may include but are not limited to a physical keyboard, a function key (such as a volume control key or an on/off key), a trackball, a mouse, and a joystick. Details are not described herein. The memory 1009 may be configured to store software programs and various data which include but are not limited to an application program and an operating system. The processor 1010 may integrate an application processor and a modem processor. The application processor mainly processes an operating system, a user interface, an application program, and the like. The modem processor mainly processes wireless communication. It can be understood that the modem processor may alternatively not be integrated in the processor 1010.

An embodiment of this application further provides a readable storage medium. The readable storage medium stores a program or instructions. When the program or instructions are executed by a processor, the processes of the foregoing video encoding method embodiments are implemented, with the same technical effects achieved. To avoid repetition, details are not described herein again.

The processor is a processor in the electronic device in the foregoing embodiments. The readable storage medium includes a computer-readable storage medium, such as a computer read-only memory (ROM), a random access memory (RAM), a magnetic disk, or an optical disc.

An embodiment of this application further provides a chip. The chip includes a processor and a communications interface. The communications interface is coupled to the processor. The processor is configured to run a program or instructions, to implement the processes of the foregoing video encoding method embodiments, with the same technical effects achieved. To avoid repetition, details are not described herein again.

It should be understood that the chip provided in this embodiment of this application may also be referred to as a system-level chip, a system on chip, a chip system, a system-on-a-chip, or the like.

It should be noted that, in this specification, the terms "include" and "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element. In addition, it should be noted that the scope of the method and apparatus in the implementations of this application is not limited to performing functions in the shown or described order, but may also include performing functions in a substantially simultaneous manner or in a reverse order depending on the functions involved. For example, the described method may be performed in an order different from that described, and steps may be added, omitted, or combined. In addition, features described with reference to some examples may be combined in other examples.

According to the foregoing descriptions of the implementations, persons skilled in the art can clearly understand that the methods in the foregoing embodiments may be implemented by using software in combination with a necessary common hardware platform, or certainly may be implemented by using hardware. However, in most cases, the former is a preferred implementation. Based on such an understanding, the technical solutions of this application essentially or the part contributing to the conventional technology may be implemented in a form of a computer software product. The computer software product may be stored in a storage medium (for example, a ROM/RAM, a magnetic disk, or a compact disc), and includes several instructions for instructing a terminal (which may be a mobile phone, a computer, a server, a network device, or the like) to perform the methods in the embodiments of this application.

The foregoing describes the embodiments of this application with reference to the accompanying drawings. However, this application is not limited to the foregoing specific implementations. The foregoing specific implementations are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A video encoding method, wherein the method comprises:
   determining, based on a first ratio, a first bit number, and a first number, a second bit number for encoding a first picture; and
   encoding the first picture based on the second bit number, wherein
   the first ratio is a ratio of predicted encoding complexity of the first picture to actual encoding complexity of M frames of second pictures, the first picture is an unencoded first frame of picture in a target group of pictures, the M frames of second pictures are encoded pictures in the target group of pictures, the first bit number is a number of remaining bits in the target group of pictures, the first number is the number of unencoded pictures in the target group of pictures, and M is an integer greater than 1;
   wherein the determining, based on a first ratio, a first bit number, and a first number, a second bit number for encoding a first picture comprises:
   determining, based on the first ratio, a weighting parameter corresponding to the first ratio; and
   determining, based on the weighting parameter, the first bit number, and the first number, the second bit number for encoding the first picture.

2. The method according to claim 1, wherein
   the determining, based on a first ratio, a first bit number, and a first number, a second bit number for encoding a first picture comprises:
   determining, based on the first ratio, the first bit number, the first number, and target parameters, the second bit number for encoding the first picture, wherein
   the target parameters comprise estimated usage of a buffering region, actual usage of the buffering region, an encoding frame rate, and an available channel transmission rate before the first picture is encoded.

3. The method according to claim 2, wherein the determining, based on the first ratio, the first bit number, the first number, and target parameters, the second bit number for encoding the first picture comprises:
   determining a third bit number based on the first ratio, the first bit number, and the first number;
   determining a fourth bit number based on the target parameters; and
   performing weighted summation on the third bit number and the fourth bit number to obtain the second bit number.

4. The method according to claim 1, wherein the encoding the first picture based on the second bit number comprises:
   determining a quantization parameter for the first picture based on the second bit number and the predicted encoding complexity of the first picture by using a quadratic rate distortion model, and encoding the first picture based on the quantization parameter.

5. The method according to claim 1, wherein before the determining, based on a first ratio, a first bit number, and a first number, a second bit number for encoding a first picture, the method further comprises:
   determining the first ratio based on the predicted encoding complexity of the first picture and average encoding complexity of the M frames of second pictures.

6. A video encoding apparatus, wherein the apparatus comprises
   a memory, a processor and a computer program stored in the memory and executable by the processor, wherein the processor executes the computer program to:
   determine, based on a first ratio, a first bit number, and a first number, a second bit number for encoding a first picture; and
   encode the first picture based on the second bit number, wherein
   the first ratio is a ratio of predicted encoding complexity of the first picture to actual encoding complexity of M frames of second pictures, the first picture is an unencoded first frame of picture in a target group of pictures, the M frames of second pictures are encoded pictures in the target group of pictures, the first bit number is a number of remaining bits in the target group of pictures, the first number is the number of unencoded pictures in the target group of pictures, and M is an integer greater than 1;

wherein the processor executes the computer program to: determine, based on the first ratio, a weighting parameter corresponding to the first ratio; and determine, based on the weighting parameter, the first bit number, and the first number, the second bit number for encoding the first picture.

7. The apparatus according to claim 6, wherein the processor executes the computer program to: determine, based on the first ratio, the first bit number, the first number, and target parameters, the second bit number for encoding the first picture, wherein the target parameters comprise estimated usage of a buffering region, actual usage of the buffering region, an encoding frame rate, and an available channel transmission rate before the first picture is encoded.

8. The apparatus according to claim 7, wherein the processor executes the computer program to: determine a third bit number based on the first ratio, the first bit number, and the first number, and determine a fourth bit number based on the target parameters; and perform weighted summation on the third bit number and the fourth bit number, to obtain the second bit number.

9. The apparatus according to claim 6, wherein the processor executes the computer program to: determine a quantization parameter for the first picture based on the second bit number and the predicted encoding complexity of the first picture by using a quadratic rate distortion model; and encode the first picture based on the quantization parameter.

10. The apparatus according to claim 6, wherein the processor executes the computer program to: before determining, based on the first ratio, the first bit number, and the first number, the second bit number for encoding the first picture, determine the first ratio based on the predicted encoding complexity of the first picture and average encoding complexity of the M frames of second pictures.

11. A non-transitory computer-readable storage medium, wherein the readable storage medium stores a program or instructions, a processor executes the program or instructions to: determine, based on a first ratio, a first bit number, and a first number, a second bit number for encoding a first picture; and encode the first picture based on the second bit number, wherein the first ratio is a ratio of predicted encoding complexity of the first picture to actual encoding complexity of M frames of second pictures, the first picture is an unencoded first frame of picture in a target group of pictures, the M frames of second pictures are encoded pictures in the target group of pictures, the first bit number is a number of remaining bits in the target group of pictures, the first number is the number of unencoded pictures in the target group of pictures, and M is an integer greater than 1;

wherein the processor executes the program or instructions to: determine, based on the first ratio, a weighting parameter corresponding to the first ratio; and determine, based on the weighting parameter, the first bit number, and the first number, the second bit number for encoding the first picture.

12. The non-transitory computer-readable storage medium according to claim 11, wherein the processor executes the program or instructions to:

determine, based on the first ratio, the first bit number, the first number, and target parameters, the second bit number for encoding the first picture, wherein the target parameters comprise estimated usage of a buffering region, actual usage of the buffering region, an encoding frame rate, and an available channel transmission rate before the first picture is encoded.

13. The non-transitory computer-readable storage medium according to claim 12, wherein the processor executes the program or instructions to:

determine a third bit number based on the first ratio, the first bit number, and the first number;

determine a fourth bit number based on the target parameters; and perform weighted summation on the third bit number and the fourth bit number to obtain the second bit number.

14. The non-transitory computer-readable storage medium according to claim 11, wherein the processor executes the program or instructions to:

determine a quantization parameter for the first picture based on the second bit number and the predicted encoding complexity of the first picture by using a quadratic rate distortion model, and encode the first picture based on the quantization parameter.

15. The non-transitory computer-readable storage medium according to claim 11, wherein before the determining, based on a first ratio, a first bit number, and a first number, a second bit number for encoding a first picture, the processor executes the program or instructions to:

determine the first ratio based on the predicted encoding complexity of the first picture and average encoding complexity of the M frames of second pictures.

\* \* \* \* \*